United States Patent [19]
Frey et al.

[11] Patent Number: 5,594,173
[45] Date of Patent: Jan. 14, 1997

[54] TEST DEVICE FOR VEHICLES HAVING A WHEEL ROTATION SPEED SENSOR WHICH IS SENSITIVE TO MAGNETIC FIELDS

[75] Inventors: Gerhard Frey, Esslingen; Thomas Hirth, Stuttgart; Dieter Grohmann, Karlsruhe; Willi Reichart, Jettingen, all of Germany

[73] Assignee: Mercedes-Benz AG, Stuttgart, Germany

[21] Appl. No.: 516,702

[22] Filed: Aug. 18, 1995

[30] Foreign Application Priority Data

Aug. 18, 1994 [DE] Germany ............... 44 29 311.9

[51] Int. Cl.$^6$ ................ G01P 3/44; G01B 7/00; G01N 27/72; G01R 35/00
[52] U.S. Cl. ................ 73/520.01; 324/207.12; 324/236; 324/202; 324/207.25; 324/173
[58] Field of Search ........... 73/514.39, 519.01, 73/520.01; 324/207.12, 236, 202, 207.25, 173, 174

[56] References Cited

U.S. PATENT DOCUMENTS

| | | | |
|---|---|---|---|
| 4,365,196 | 12/1982 | Finch | 324/202 |
| 4,866,376 | 9/1989 | Fujiki et al. | 324/160 |
| 4,972,145 | 11/1990 | Wood et al. | 324/207.12 |
| 4,987,366 | 1/1991 | Hamel | 324/207.26 |
| 5,375,460 | 12/1994 | La Belle | 73/117 |

FOREIGN PATENT DOCUMENTS

| | | |
|---|---|---|
| 0047813 | 3/1982 | European Pat. Off. . |
| 0242058 | 10/1987 | European Pat. Off. . |
| 0338373 | 10/1989 | European Pat. Off. . |
| 2545414 | 4/1977 | Germany . |
| 4027046 | 4/1991 | Germany . |
| 3936988 | 5/1991 | Germany . |
| 2096327 | 10/1982 | United Kingdom . |
| WO93/22630 | 11/1993 | WIPO . |

*Primary Examiner*—Hezron E. Williams
*Assistant Examiner*—Richard A. Moller
*Attorney, Agent, or Firm*—Evenson, McKeown, Edwards & Lenahan, P.L.L.C.

[57] ABSTRACT

A test device for vehicles has a wheel rotation speed sensor which is sensitive to magnetic fields. The test device, having a wheel rotation simulation device, contains a sensor stimulating magnet coil, which can be positioned in the magnetic field region of the sensor such that a magnetic field coupling is provided. A control unit, drives this magnet coil with an AC voltage at a frequency which determines the wheel rotation speed. This allows the performance of functional tests of components which are sensitive to wheel rotation speed while keeping the wheels stationary. In addition, a compact roller unit, which is preferably transportable, is provided in order to carry out actual wheel rotations in order to make it possible to test further components, such as the brake system or electronic transmission control. Consequently, component tests which are sensitive to wheel rotation speed can be carried out at the production location and in workshops in a manner which is flexible and optimized with respect to time and cost.

8 Claims, 3 Drawing Sheets

TEST DEVICE FOR VEHICLES HAVING A WHEEL ROTATION SPEED SENSOR WHICH IS SENSITIVE TO MAGNETIC FIELDS

BACKGROUND AND SUMMARY OF THE INVENTION

The invention relates to a test device for vehicles having a wheel rotation speed sensor which is sensitive to magnetic fields.

Such sensors are in use, for example, as Hall sensors or inductive sensors. The latter, for example, include a bar magnet which is arranged such that it cannot move. The bar magnet has a soft-magnetic pole pin which is fitted with an induction coil. The inductive sensors also include a toothed wheel which is coupled to the wheel rotation. The toothed wheel influences the magnetic fields. The toothed wheel rotates in front of the pole pin and, consequently, induces in the coil a voltage which is proportional to the rate of change of the magnetic flux. A uniform tooth structure corresponds to a voltage profile which is similar to a sinusoid, so that the wheel rotation speed can be obtained from the interval between the zero crossings of the induction voltage. The amplitude of the voltage signal additionally is proportional to the rotation speed.

Such a known inductive wheel rotation speed sensor system is frequently used in wheel slip control systems, such as anti-lock braking systems and drive slip controllers. A further design for a sensor which is sensitive to magnetic fields and is suitable, for example, for position determination on a shock absorber of a vehicle, is described in European Patent document EP O 242 058 A1. The sensor disclosed there is controlled by a microcomputer and contains an excitation coil as well as a sampling coil. The sampled signal of the sampling coil is dependent on the shock absorber position and can be evaluated by the microcomputer.

A test of the serviceability of a vehicle which is equipped with such a wheel rotation speed sensor system requires, inter alia, the checking of the controllers which process the wheel rotation speed and other vehicle components which react to the wheel rotation speed sensor signals, as well as their connections to one another. This test can be carried out in a known manner on a conventional roller test rig which is of complex design and is not transportable. For this purpose, the motor vehicle is accelerated on the roller test rig to the predetermined rotation speed levels, and the inductive rotation speed sensors on the wheels provide a signal which is proportional to the rotation speed. The signal is passed on to the relevant vehicle components to be tested. This tests, for example, whether the windscreen wiper interval changing, which is dependent on rotation speed, is operating; whether the tachometer is correctly calibrated; whether the safety turn-off of a cruise controller is responding in the desired manner; and/or whether existing longitudinal dynamics controllers are providing appropriate values. It is possible to provide a test computer in order to evaluate the diagnostic information. Very high wheel rotation speeds are necessary for some of these tests, for which the conventional test rig must be designed if it is intended to be used to carry out such tests. Transportable test rigs, such as the mini-brake test rig which is disclosed in Laid-Open Specification DT 25 45 414 A1, are also already known in addition to fixed-position roller test rigs.

It is furthermore known to perform tests of vehicle components using simulation and/or stimulation apparatuses. For example, Great Britain Patent document GB 2 096 327 A discloses a portable test device in which it is possible to test the serviceability of tachographs as well as of the pulsed signal lines which lead to associated sensors. The test device is looped into the connection path between the tachograph and the sensors for this purpose. The test device allows signals to be produced which simulate sensor signals which are dependent on the wheel rotation speed, in order to check the tachograph, and allows a test voltage to be produced for testing the connecting lines to the sensors for short circuits or interruptions, and also allows the corresponding response signals to be evaluated.

German Patent document DE 3 936 988 A1 describes an apparatus for motor vehicle diagnosis, in which a diagnostic signal coupler can include a stimulation unit for stimulation of a signal destination, such as an actuator. It is possible for the stimulation signal to be transmitted in a DC-isolated manner via transformers or optocouplers. The arrangement of a stimulation unit within a vehicle test device is also known, from European Patent document EP O 47 813 B1. This specifies the provision of the stimulation apparatus for simulation of signals when the vehicle is stationary in the same way as those which actually occur during operation of the vehicle in order, in this manner, to test associated signal processing components in the vehicle, with the vehicle stationary, such as electronic fuel injection systems, electronic ignition systems or automatic brake systems, for example.

European Patent document EP O 338 373 A3 discloses a test ring for testing the drive train of a vehicle, in which a plurality of electrical load machines, whose torque is independently controlled, are connected via flanges directly to the shafts of the drive train to be tested, instead of the conventional rollers. The load machines are driven by a simulation computer. In this manner, the drag during motion, the wheels, and the vehicle acceleration behavior, are simulated by actual vehicle components, such as the main drive train, the axle drive, shafts, the clutch, the transmission and the internal combustion engine. At the same time, simulations of turning, of spinning wheels, of different wheel radii, and of spinning or locked wheels are possible.

There is therefore needed a device for testing vehicle components which receive signals from a wheel rotation speed sensor system which is sensitive to magnetic fields. By using this device, complex test processes for these components can be carried out flexibly and reliably with little design complexity.

These needs are met according to the present invention by a test device for vehicles having a wheel rotation speed sensor which is sensitive to magnetic fields. An appliance for simulation of wheel rotations has a magnet coil which stimulates sensors and can be positioned in the magnetic field region of the sensor such that magnetic field coupling is provided. A control unit applies an AC voltage to the magnet coil. The frequency of the AC voltage determines the sensed rotation speed of the simulated wheel rotation.

The provision of the appliance which simulates wheel rotation and whose design is optimally matched to the stimulation of an inductive wheel rotation speed sensor while keeping the design complexity low, makes it possible to check vehicle components to which such rotation speed sensor signals are fed. This testing can be done when the vehicle is stationary and without actual wheel rotation having to be carried out. To this end, the control unit uses the magnet coil to simulate the reaction signal for the sensor receiving part as is supplied, for example, by a coupled toothed wheel, which influences magnetic fields during actual wheel rotation.

It is an advantage of the invention that wheel rotation speed profiles of predetermined driving cycles can be simulated by the computer for the wheel rotation speed sensor system, so that vehicle components which are sensitive to wheel rotation speeds can be tested in the conditions of a desired driving cycle when the vehicle is, in reality, stationary.

A further advantage of the invention is that the test device additionally has rollers which are driven by DC motors and can be brought into rolling contact with a vehicle wheel in order to be able to carry out actual rotations of selected wheels for specific tests. Comparatively slow wheel speeds are sufficient for these tests of, for example, mechanical, hydraulic or pneumatic vehicle components such as ABS or wheel-slip traction control brake system components. In view of this, in contrast to complex, stationary roller test rigs, the roller unit does not need to be designed for high speeds and loads and, can be constructed in a compact and/or transportable manner.

In combination with the device which simulates wheel rotations, functional tests can be carried out with only simulated wheel rotation, for example for cruise control testing. This is done with wheel rotations which are actual and free of engine load. In addition, the wheel rotations are simulated if required, for example for ABS or wheel-slip traction control testing. The tests can also be done with actual wheel rotations under engine load and, if required, additional simulated wheel rotations on non-driven axles, for example for testing the electronic transmission control. Furthermore, this refinement makes it possible to avoid the consequent double fault in brake system testing, in particular for testing vehicle dynamics control.

Until now, the connections of the rotation speed sensors and of the ABS brake system have been tested on the conventional roller test rig. For this purpose, the wheels are accelerated by the vehicle drive, the non-driven wheels are also accelerated via a belt coupling on the roller test rig, and the belt drive is subsequently decoupled. The wheels are sequentially braked via the ABS. The sequential braking is introduced via the diagnostic interface and the drop in rotation speed of the driven wheels is measured. If the left-hand and the right-hand sensor connection and, in addition, the left-hand and the right-hand ABS control section, for example, have now been interchanged during assembly, this fault cannot at the moment be detected. The vehicle dynamics control, which makes use of the sensor system and the ABS, can thus not be completely tested.

This double fault can, by contrast, be detected easily using the test device designed according to the present invention. For this purpose, the sensors are stimulated and the stimulation values are read out via the diagnostic interface or via a data bus. The comparison of the values which have been read out with the stimulation values indicates whether the sensors are correctly connected. The further testing of the ABS is carried out using the roller unit. The above double fault can thus be unambiguously detected.

In addition, this refinement of the invention allows the detection of double faults in the system, for example if the transmission controller contains an incorrect software version with incorrect gear ratios and, at the same time, an axle which is intrinsically not correct for the vehicle but whose gear ratio matches that of the controller has been installed. Using conventional means, this double fault can only be detected at high cost. By contrast, using the test device which has been developed according to the invention, the connection and the software of the controller can initially be determined via a diagnostic line using a wheel rotation simulation with associated wheel rotation speed sensor stimulation and, subsequently, the gear changes can be tested by actually driving the wheels on the drive axle. Advantageous implementations of the roller unit are also provided.

Other objects, advantages and novel features of the present invention will become apparent from the following detailed description of the invention when considered in conjunction with the accompanying drawings.

DETAILED DESCRIPTION OF THE DRAWINGS

Figure 2:
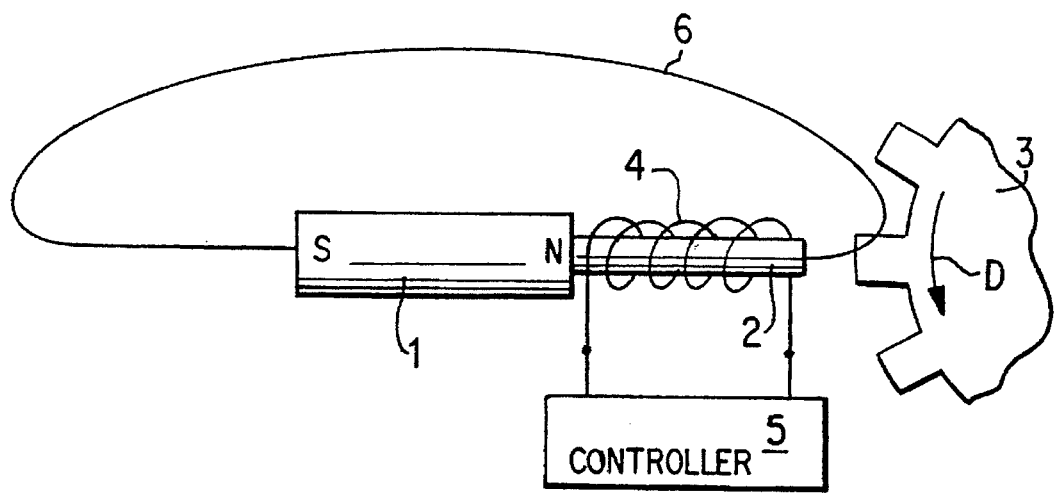
FIG. 2 is a schematic diagram of a conventional wheel rotation speed sensor.

For a better understanding of the invention, the known method of operation of an inductive wheel rotation speed sensor is explained first with reference to FIG. 2. The typical inductive wheel rotation speed sensor which is shown schematically in FIG. 2 contains a bar magnet 1 having a magnetic south pole (S) and a magnetic north pole (N). At one of the ends, a soft-magnetic pole pin 2 projects outward. The pole pin 2 is surrounded by a measurement coil 4. Magnetic lines of force 6 run from the magnetic north pole of the pole pin 2 through the space to the magnetic south pole S of the bar magnet 1. The bar magnet 1, pole pin 2 and measurement coil 4 are arranged such that they do not also move during rotation of the vehicle wheels. A toothed wheel 3, which influences magnetic fields and is coupled to the rotation of an associated vehicle wheel, is located opposite the magnetic north pole of the pole pin 2, at a specific, short distance away from it. During rotation (D) of the toothed wheel 3, the teeth of the toothed wheel 3 periodically vary the magnetic field 6 which is produced. As a result, a corresponding periodic induction voltage is produced in the measurement coil 4. In this case, both the amplitude and the frequency of the time profile of the induction voltage are proportional to the wheel rotation speed. A uniform tooth structure corresponds to a sinusoidal voltage profile. The voltage signal of the measurement coil 4 is passed to an ABS/wheel-slip traction control controller 5. There, the signal is evaluated and introduced into a vehicle data bus (not shown), or is conditioned via other connecting lines for further controllers, for example an emission gas controller, and is fed from there into the data bus.

Figure 5:
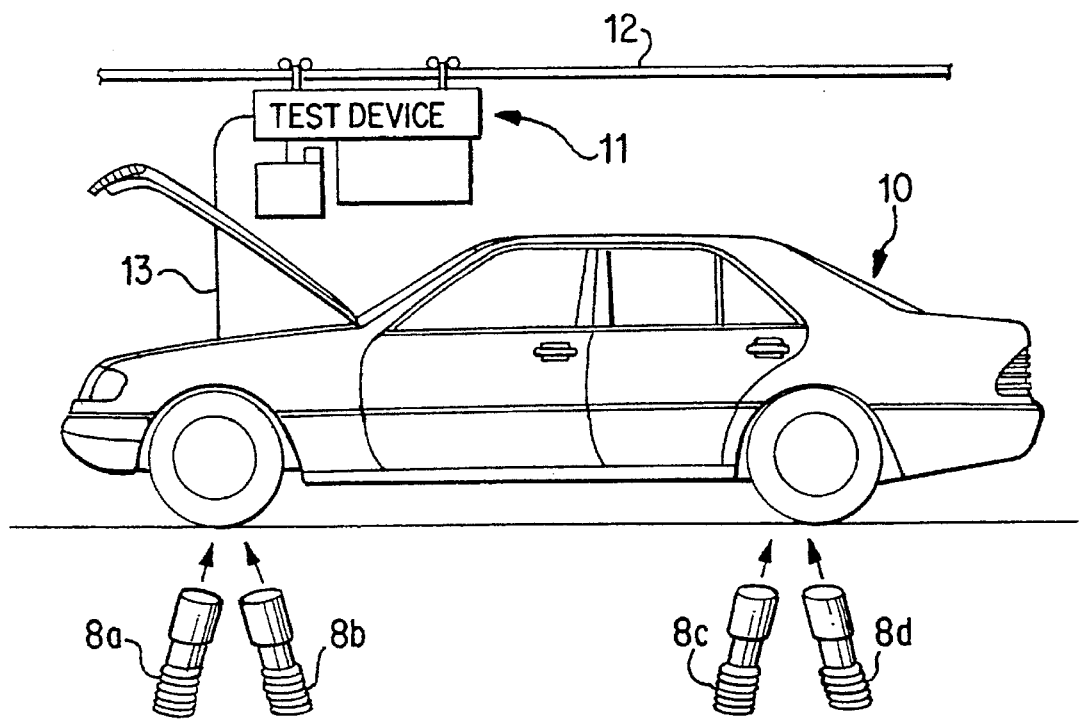
FIG. 5 is a schematic side view of a vehicle on a test device having a wheel rotation simulation device which can be activated for all wheels.
Figure 6:
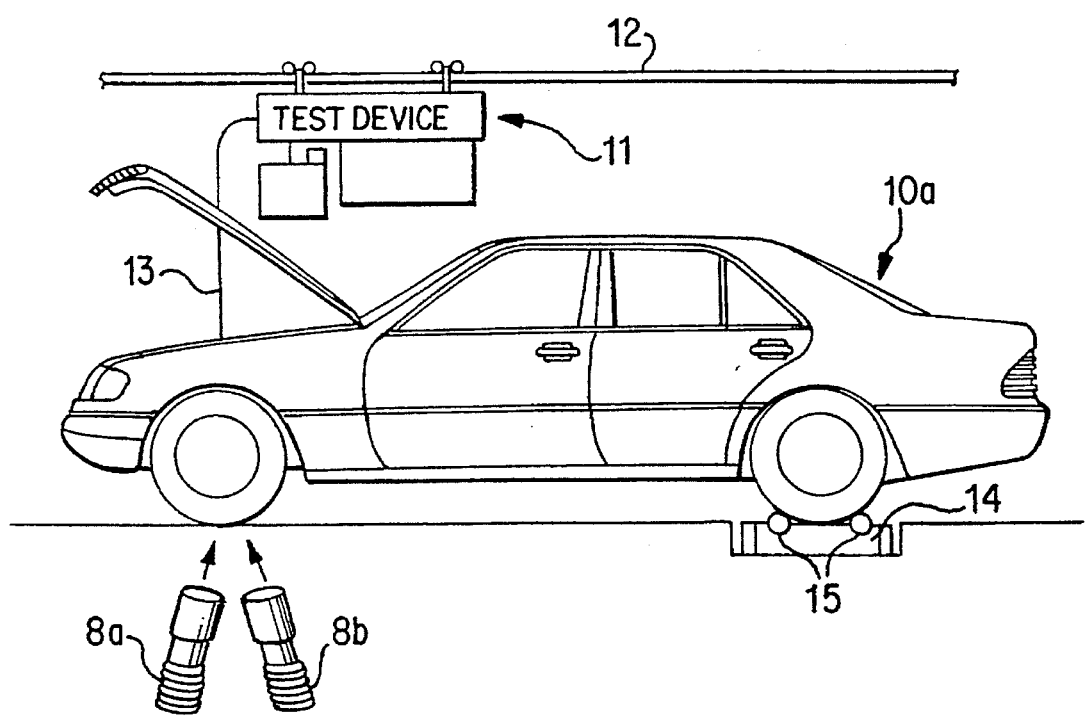
FIG. 6 is a view corresponding to FIG. 5, but with a wheel rotation simulation device which can be activated only on the front wheels, and with a roller unit on the rear wheels.

In order to be able to test the functionality of such an inductive wheel rotation speed sensor system and of the electronic and electrical vehicle components which process the wheel rotation speeds, on the one hand at an early stage during vehicle production and on the other hand in repair workshops as well, a test device is provided which is illustrated schematically in FIGS. 5 and 6. The wheel rotation speeds are obtained from this sensor system as state variables.

Figure 1:
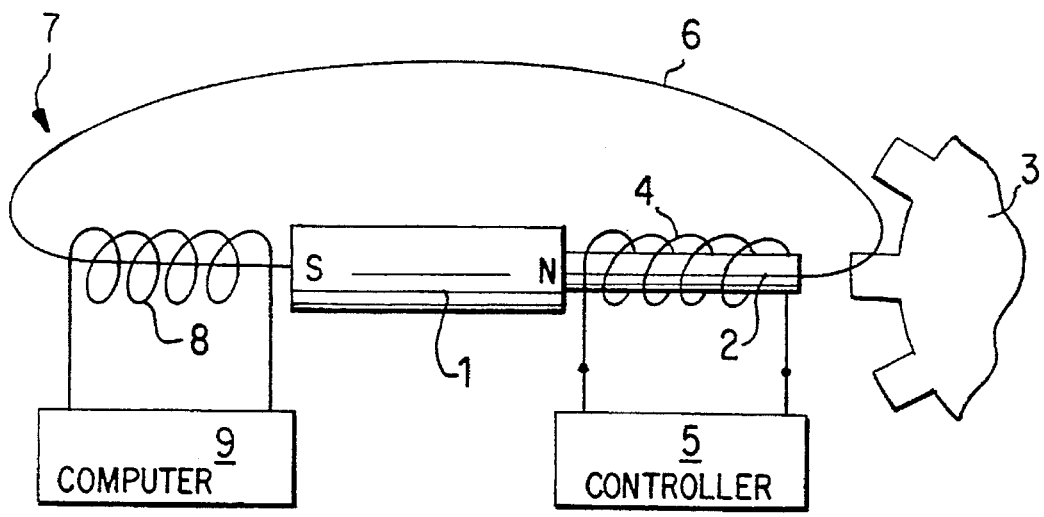
FIG. 1 is a schematic diagram of an inductive wheel rotation speed sensor with an associated wheel rotation simulation device according to the present invention.

The test device contains a wheel rotation simulation device 7 for the inductive wheel rotation speed sensor system whose arrangement is sketched on the sensor in FIG. 1. This wheel rotation simulation device 7 contains a sensor-stimulating magnet coil 8 which is introduced from the rear into the magnetic field of the sensor on the side opposite the toothed wheel 3 and is arranged at a suitable distance from the south pole (S) of the bar magnet 1. The magnet coil 8 is driven with an AC voltage from a simulation computer 9 as the control unit. The AC voltage which is applied to the magnet coil 8 produces changes in the magnetic field 6 of the inductive sensor (1 to 4) which are equivalent to those which are produced by rotation Of the toothed wheel 3 during actual wheel rotations. In particular, the voltage signal which is induced in the measurement coil 4 in this way has an identical frequency if the computer 9 chooses the frequency of the AC voltage which is applied to the magnet coil 8 to be the same as the frequency of the Sequence of teeth on the toothed wheel 3 which move past the pole pin 2 during actual wheel rotation. In consequence, wheel rotation at any desired rotation speed, and any desired rotation speed time profile can be simulated, in a computer-aided manner, using the wheel rotation simulation device 7 for the inductive wheel rotation speed sensor system (1 to 4) and the downstream vehicle components which make use of the output signal from the sensor system. Predetermined driving cycles can be converted into AC voltage signals for the magnet coil 8 having a matching frequency profile with the aid of the computer and can be passed to the coil 8 in order to be able to test the components using such driving cycles without actual wheel rotations being necessary. If required, the magnet coil 8 can be equipped with a ferromagnetic core.

Figure 3:
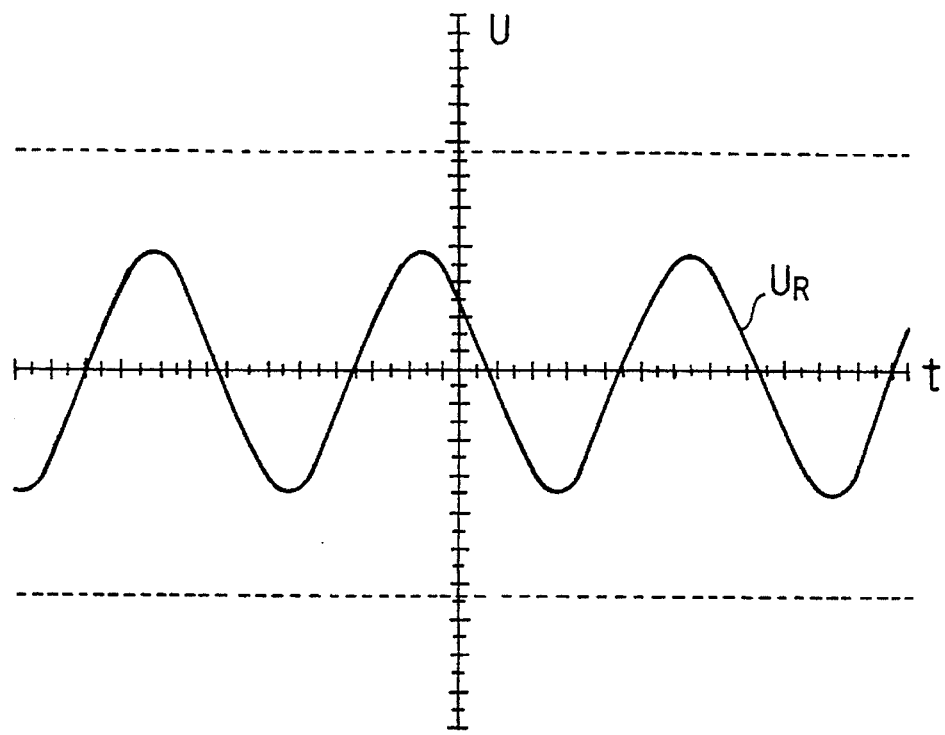
FIG. 3 illustrates an oscilloscope display with a typical induction voltage signal, which is representative of the wheel rotation speed, of the sensor in FIG. 2.
Figure 4:
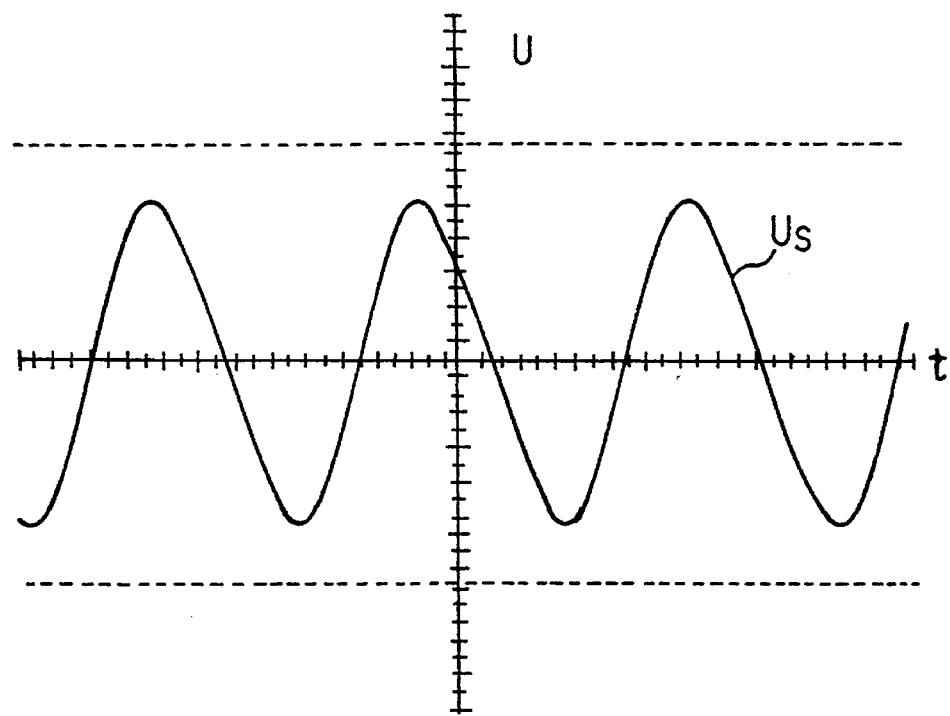
FIG. 4 illustrates an oscilloscope display with a sensor induction voltage signal which is obtained using the arrangement in FIG. 1 by simulation of the actual wheel rotations associated with FIG. 3.

By way of example, FIGS. 3 and 4 compare output signals from the sensor coil 4 resulting, on the one hand, for the case of actual wheel rotation and, on the other hand, for an associated wheel rotation simulation. The two oscilloscope displays both show time (t) on the abscissa and voltage (U) on the ordinate, in any units. The illustration in FIG. 3 shows an induction voltage profile ($U_R$) such as that which results from actual wheel rotation, and thus from rotation of the toothed wheel 3, in the case of the sensor in FIG. 2. This is compared with an associated simulation result in FIG. 4, in which an AC voltage frequency, which corresponds to the tooth repetition frequency during the actual wheel rotation in FIG. 3, is applied to the sensor-stimulating magnet coil 8 with the wheel stationary, using the arrangement in FIG. 1. It can be seen that the frequency of the induction voltage ($U_S$) resulting in the measurement coil 4 from this simulation is identical to that ($U_R$) of the actual wheel rotation, so that the inductive wheel rotation speed sensor system and the vehicle components connected downstream from it can be tested by this simulation, in terms of their functionality, using any desired wheel rotation speeds and wheel rotation speed profiles, while the vehicle wheels are in reality stationary.

The wheel rotation simulation device 7, which is illustrated in FIG. 1 in order to explain the functional principle, is part of an overall test device 11 which is illustrated in FIGS. 5 and 6. The majority of the test device 11 is arranged on a test section in the vehicle production process, such that it can move on a rail 12. Alternatively, such a test device 11 can also be provided in workshops. It also is possible for the test device to be constructed so as to be portable.

The test device 11 allows the operation of those vehicle components which are sensitive to wheel rotation speeds to be tested using widely different wheel rotation states. It is possible, in general, to distinguish between functional tests without actual wheel rotation, that is to say only with simulated wheel rotation, with actual wheel rotation without any engine load, and with engine-driven actual wheel rotation. The functional tests without any engine load and actual wheel rotation relate, for example, to the functions of a cruise controller in terms of the safety turnoff thereof, the speed-dependent windscreen wiper interval switching and the speed warning totalizer. This test process can be seen in FIG. 5. During this test process, all four wheels of the vehicle 10 remain stationary. An associated measurement coil of the simulation device is moved via a respective mechanical device (8a, 8b, 8c, 8d), which is shown symbolically, into the magnetic field region of each inductive wheel rotation speed sensor. The four measurement coils are driven individually, by the simulation computer which is integrated into the test device 11, with the AC voltage which respectively matches the respective test process for it. Presetting an appropriate wheel rotation speed simulation cycle also allows speed calibration of the tachometer to be carried out, using this test arrangement, via the stimulation of the inductive wheel rotation speed sensors. The measurement data from the vehicle components to be tested and, if appropriate, the wheel rotation speed sensors are in this case each passed via a measurement line 13 to the test device 11.

Some functional tests, such as the test of the ABS and/or wheel-slip traction control brake system, as well as the checking of the sensor installation, make actual wheel rotations necessary. For this purpose, the test device 11 includes a transportable roller unit 14. The roller unit 14, in each case has two rollers 15 per vehicle wheel, or, alternatively, with only one roller. The rollers can be driven, in a manner which is not shown in greater detail, by a programmable control section of the test device 11, via DC motors. FIG. 6 shows the case in which the rear wheel drive shaft wheels are seated on, in each case, one pair of rollers 15. For this purpose, the vehicle 10 is moved such that its rear wheels are on the ground supported roller units 14 while the front wheels continue to be in contact with the ground. The rear wheels, which are supported against the rollers 15, such that they are in rolling contact with them, because of the vehicle's weight are driven by the rollers 15 at a relatively slow speed in order to test the brake system. During braking operation, the current in the DC motors which drives the rollers rises in accordance with the braking torque which acts on the rollers, such that the serviceability of the brake system can be determined by measuring the current. An analogous procedure can be used to test the front wheels.

For tests relating to the wheel-slip traction control, the vehicle dynamics control and the electronic transmission control, the rear axle drive wheels which are located on the rollers 15 are optionally driven by the vehicle engine or by the rollers 15 and their rotation speed is inductively sensed. The rotation speed is sensed without making contact by the rotation speed sensors or, alternatively, is read via an existing diagnostic interface or a data bus and is passed as signal information to the simulation computer of the test device 11. If required on the basis of these rear wheel rotation speeds, the computer stimulates the rotation speed sensors of the stationary front wheels, without touching them, using the magnet coils, in the manner which is suitable for the respective test. For this purpose, the magnet coils for the front wheels are introduced with the mechanical positioning devices (8a, 8b) into the respective sensor magnetic field region, as is illustrated schematically in FIG. 6. Consequently, any desired driving situations, such as traction slip for example, can be simulated in a computer-aided manner using this configuration. Accordingly, the entire system, to the extent that it relates to components which are sensitive to wheel rotation speeds, can also be tested under engine load. It is possible to vary the wheel rotation speeds at the front and rear and on the left and right as desired.

When testing the electronic transmission control, a particular advantage of the test device 11 is that double faults can be detected which result, for example, from a transmission controller having an incorrect software version and, consequently, incorrect gear ratio while at the same time using an incorrect axle with an incorrect gear ratio which matches the controller, and which cannot be detected using conventional means. The procedure in this case is that the software and the connection of the transmission controller are initially tested, using the simulation device part of the test device 11, via sensor stimulation of the wheel rotation speed sensors of the drive shaft with the drive wheel stationary. Subsequently, once the serviceability of the transmission controller has in consequence been verified, the gear changes are tested by actually driving the drive axle rear wheels. The double faults mentioned can be reliably detected in this way.

The test device which has been described above offers the advantage that relatively complex test processes of vehicle components which are sensitive to wheel rotation speeds can be simply carried out using the invention without any conventional, stationary, complex roller test rig. The tests can be performed in a manner which is optimal in terms of time, production and maintenance.

A further advantage of this device is its high flexibility, as it is not linked to a specific location. Appropriate tests can thus be carried out at the locations at which the relevant vehicle components are assembled. Assembly faults can thus be corrected immediately during production.

In addition to those which have been explicitly stated, further functional tests which are dependent on wheel rotation speeds are, of course, also possible. Using the wheel rotation simulation device with the sensor stimulating magnet coil, all the functional tests relating to this can be carried out without using a conventional, stationary roller test rig. In particular, the functions of numerous subsystems which are sensitive to rotation speeds in the motor vehicle, such as a cruise controller, tachometer, windscreen wiper interval change and speed warning totalizer, for example, can be tested simply by means of the external simulated signal input. The functional tests which still remain, for example relating to the brake system and an electronic transmission controller, can be carried out by additionally using the compact, transportable roller unit or on a conventional, stationary roller test rig. It is possible to limit these tests to investigations at a relatively low wheel rotation speed, so that a stationary test rig no longer needs to be designed for the maximum wheel rotation speed. In addition, the roller test rig times are reduced, and the reduced size of such test rigs makes considerable cost reductions possible.

It is self-evident that numerous modifications of the test device described above are possible for one of ordinary skill in the art, in the context of the present invention. Thus, for example, instead of the transportable roller unit 14 which can be placed on the ground, a roller unit which is firmly anchored in the ground can be provided, or a roller unit in which the rollers are pressed against the wheel of a raised vehicle in order to ensure the rolling contact between the rollers and the tires can be used. In addition, such a test device is also suitable for vehicles in which so called Hall-effect sensors are used for wheel rotation speed monitoring, in which a magnetic field, which is produced and is modified as a function of the wheel rotation speed, causes a correspondingly varying, measurable electrical voltage in a Hail element.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A test device for a vehicle having a wheel rotation speed sensor which is sensitive to magnetic fields, comprising:
   a wheel rotation simulation device including a magnet coil positionable in a magnetic field region of said wheel rotation speed sensor such that a magnetic field coupling is provided to stimulate said wheel: rotation speed sensor; and
   a control unit coupled to said magnet coil for applying an AC voltage thereto, and controlling an AC voltage frequency of said magnet coil to determine a sensed rotation speed of a simulated wheel rotation.

2. A test device according to claim 1, wherein said control unit comprises a simulation computer producing AC voltage signals, said AC voltage signals corresponding to wheel rotation speed profiles of predetermined driving cycles for each of the vehicle wheels.

3. A test device according to claim 1, further comprising:
   a roller unit having at least two rollers, said rollers being driven by DC motors, said roller unit being positioned with respect to a wheel of the vehicle such that said at least two rollers are in rolling contact with said wheel.

4. A test device according to claim 2, further comprising:
   a roller unit having at least two rollers, said rollers being driven by DC motors, said roller unit being positioned with respect to a wheel of the vehicle such that said at least two rollers are in rolling contact with said wheel.

5. A test device according to claim 3, wherein said roller unit is a transportable unit positionable on an associated vehicle wheel and supported on a ground surface.

6. A test device according to claim 3, wherein the roller unit is a transportable unit freely positionable on an associated vehicle wheel such that said at least two rollers press against said wheel.

7. A method for performing tests on a vehicle having a wheel rotation speed sensor which is sensitive to magnetic fields, the method comprising the steps of:
   positioning a magnet coil in a magnetic field region of said wheel rotation speed sensor so as to provide a magnetic field coupling therewith; and
   simulating wheel rotations by applying an AC voltage to the magnet coil via a control unit, a frequency of the AC voltage determining a sensed rotation speed of a simulated wheel rotation.

8. A method according to claim 7, wherein said simulating step further comprises the step of producing AC voltage signals which correspond to wheel rotation speed profiles of predetermining driving cycles for each wheel of the vehicle.

\* \* \* \* \*